United States Patent
Inoue et al.

(10) Patent No.: US 11,179,669 B2
(45) Date of Patent: Nov. 23, 2021

(54) HONEYCOMB ADSORPTION OBJECT AND A DEHUMIDIFICATION AIR CONDITIONER USING IT

(71) Applicant: SEIBU GIKEN CO., LTD., Fukuoka (JP)

(72) Inventors: Koji Inoue, Fukuoka (JP); Keimei Furuki, Fukuoka (JP); Ayako Kuroda, Fukuoka (JP)

(73) Assignee: SEIBU GIKEN CO., LTD., Fukuoka (JP)

( * ) Notice: Subject to any disclaimer, the term of this patent is extended or adjusted under 35 U.S.C. 154(b) by 349 days.

(21) Appl. No.: 16/451,803

(22) Filed: Jun. 25, 2019

(65) Prior Publication Data

US 2020/0070086 A1 Mar. 5, 2020

(30) Foreign Application Priority Data

Aug. 28, 2018 (JP) .............................. JP2018-158811

(51) Int. Cl.
*B01D 53/26* (2006.01)
*B01D 53/06* (2006.01)
(Continued)

(52) U.S. Cl.
CPC ........... *B01D 53/06* (2013.01); *B01D 53/261* (2013.01); *B01D 53/28* (2013.01); *F24F 3/1423* (2013.01);
(Continued)

(58) Field of Classification Search
CPC ...... B01D 53/06; B01D 53/261; B01D 53/28; B01D 2253/106; B01D 2253/108;
(Continued)

(56) References Cited

U.S. PATENT DOCUMENTS

| 5,667,560 A | * | 9/1997 | Dunne | ................... B60H 3/024 95/113 |
| 2014/0286844 A1 | * | 9/2014 | Wilcox | ..................... B01J 20/20 423/230 |

(Continued)

FOREIGN PATENT DOCUMENTS

| JP | 2014-97437 | 5/2014 |
| JP | 2016-2519 | 1/2016 |
| JP | 2019-18157 | 2/2019 |

*Primary Examiner* — Frank M Lawrence, Jr.
(74) *Attorney, Agent, or Firm* — Staas & Halsey, LLP

(57) ABSTRACT

A dehumidification air conditioner reduces carbon dioxide levels in a low humidity workroom. Cooling dehumidification is performed on outdoor air in a pre-air-cooler to produce pre-cooled air, which is branched such that a first part passes through a processing zone of an adsorption rotor which can remove carbon dioxide and humidity simultaneously, and a second part passes through a purge zone of the adsorption rotor. Air which passed through the processing zone is supplied to a low humidity workroom. Air which passed though the purge zone of the adsorption rotor is mixed with outdoor air and then heated with a reproduction heater to produce heated air. The heated air is sent to a reproduction zone of the adsorption rotor, to simultaneously remove carbon dioxide and humidity from the adsorption rotor and produce an exhaust stream which exhausted out of the device.

15 Claims, 3 Drawing Sheets

(51) Int. Cl.
 *B01D 53/28* (2006.01)
 *F24F 3/14* (2006.01)
(52) U.S. Cl.
 CPC .............. *B01D 2253/106* (2013.01); *B01D 2253/1124* (2013.01); *B01D 2253/304* (2013.01); *B01D 2253/3425* (2013.01); *B01D 2257/504* (2013.01); *B01D 2257/80* (2013.01); *B01D 2259/4009* (2013.01); *B01D 2259/4508* (2013.01)
(58) Field of Classification Search
 CPC ...... B01D 2253/1124; B01D 2253/304; B01D 2253/3425; B01D 2257/504; B01D 2257/80; B01D 2259/4009; B01D 2259/4508; F24F 1/0071; F24F 1/0083; F24F 3/1423; F24F 2203/1032; Y02A 50/20; Y02C 20/40
 USPC .... 96/125, 126, 130, 144, 146; 95/113, 139, 95/117, 118; 34/80, 472, 473; 423/230
 See application file for complete search history.

(56) References Cited

U.S. PATENT DOCUMENTS

2016/0175772 A1\* 6/2016 Maruyama ............. B01D 53/62
                                                         422/173
2019/0022574 A1  1/2019 Jin et al.

\* cited by examiner

HONEYCOMB ADSORPTION OBJECT AND A DEHUMIDIFICATION AIR CONDITIONER USING IT

CROSS-REFERENCE TO RELATED APPLICATIONS

This application is based on and hereby claims priority to Japanese Patent Application No. 2018-158811 filed Aug. 28, 2018, the contents of which are hereby incorporated by reference.

BACKGROUND

A dehumidification air conditioner may be suitable for a manufacture plant of a lithium ion battery.

If the manufacture plant of a lithium ion battery does not dehumidify, it will produce a problem in the quality of a lithium ion battery. That is, since lithium reacts to moisture strongly, the manufacture plant of a lithium ion battery needs to set the dew point as 30 Centigrade minus or less (let all temperature be "Centigrade" henceforth).

By the nickel series anode material of a lithium ion battery adsorbing water and carbon dioxide, and forming the lithium ion and lithium compound which were eluted from the inside of anode material, degradation of an electrode occurs and it is explained that the charge cycling characteristics of a battery worsen.

Thus, in order to make the conditions of the low dew point with low carbon dioxide levels, liquid nitrogen is evaporated and to make the air in a plant replace by nitrogen. In this method, since oxygen is lost indoors, there is a problem of it becoming impossible for people to enter.

Then, although using the adsorption-type dehumidification air conditioner which used humidity adsorption material for making low dew point environment is realistic and many plants use this, there is a problem that it is difficult to make carbon dioxide levels low.

Then, carbon dioxide levels are low and there is art indicated in Patent Document 1, Japanese Patent Publication No. 2014-97437A, as art which makes low dew point environment. The art indicated by Patent Document 1 is the art which performs indoor dew point control with sufficient accuracy, and can also make carbon dioxide levels low. Carbon dioxide adsorption material, such as sodium hydroxide, was used for this art, and when carbon dioxide adsorption capability declined in connection with movable time, it needed to exchange it for new carbon dioxide adsorption material.

Patent Document 2, Japanese Patent Publication No. 2016-2519A, have art of a statement as art which solves the problem of carbon dioxide adsorption material exchange of Patent Document 1. What was indicated by Patent Document 2 controls the indoor dew point and carbon dioxide levels by controlling the number of rotations of this rotor using humidity and a carbon dioxide adsorption rotor.

The art indicated by Patent Document 3, Japanese Patent Publication 2019-18157 related to U.S. Patent Publication US-2019-0022574, is suitable for the room where indoor capacity is comparatively bigger than the glove box of Patent Document 1 or Patent Document 2, etc. This art makes low the carbon dioxide levels in the low humidity workroom of the size which can be worked by people going into inside. Therefore, the dehumidification air conditioner provided with the carbon dioxide adsorption rotor and the humidity adsorption rotor is used.

SUMMARY

What was indicated by Patent Document 1 and Patent Document 2, makes the low dew point environment which made indoor carbon dioxide levels low as above-mentioned. Both of the above-mentioned art is the art which indoor capacity uses for about 1-3 m3 and a comparatively small glove box. It is equipped with the glove made of rubber so that the hygroscopic surface moisture to which such a glove box comes out of people's hand may not go indoors. Therefore, there was a problem of being inapplicable in a low humidity workroom like a dry room, in which people work entering indoors like the manufacture plant of a lithium ion battery.

The art indicated by Patent Document 3 makes low the carbon dioxide levels of a low humidity workroom like a dry room in which people work going indoors. However, since the dehumidification air conditioner which carries two kinds of rotors, a carbon dioxide adsorption rotor and a humidity adsorption rotor, was used, as compared with the dehumidifier system given in Patent Document 1 and Patent Document 2 which carry one kind of rotor, the device became large and the initial cost also had the problem of becoming high.

The inventors propose a dehumidifier system which carries the rotor which was made in order to cancel the above-mentioned subject, and can remove moisture and carbon dioxide simultaneously. The proposal relates to comparatively indoor capacity being large and there being a dry room which can be worked by people going into inside. An object is to provide the dehumidification air conditioner which can make low concentration of the carbon dioxide in a low humidity workroom.

The inventors propose a pre air cooler which cools the outdoor air, and branches in a part of air by which cooling dehumidification was carried out by the pre air cooler, and it lets it pass to the adsorption zone of the adsorption rotor which can remove moisture and carbon dioxide simultaneously. It lets a part of remaining air cooled by the pre air cooler pass in the purge zone of the adsorption rotor which can remove moisture and carbon dioxide simultaneously. The main features of the proposal are supplying indoors the air which became low moisture and low carbon dioxide levels.

One set of the adsorption rotor which can remove carbon dioxide and humidity simultaneously is used for the dehumidification air conditioner of the proposed device. The device can lower the dew point temperature in drying rooms, such as a dry room, and also can also lower carbon dioxide levels.

It became possible to provide the device in the one path which cannot do the return of the air to the dehumidification air conditioner from a dry room.

BRIEF DESCRIPTION OF THE DRAWINGS

These and or/other aspects and advantages will become apparent and more readily appreciated from the following description of the embodiments, taken in conjunction with the accompanying drawings of which.

DETAILED DESCRIPTION OF THE PREFERRED EMBODIMENTS

Figure 1:
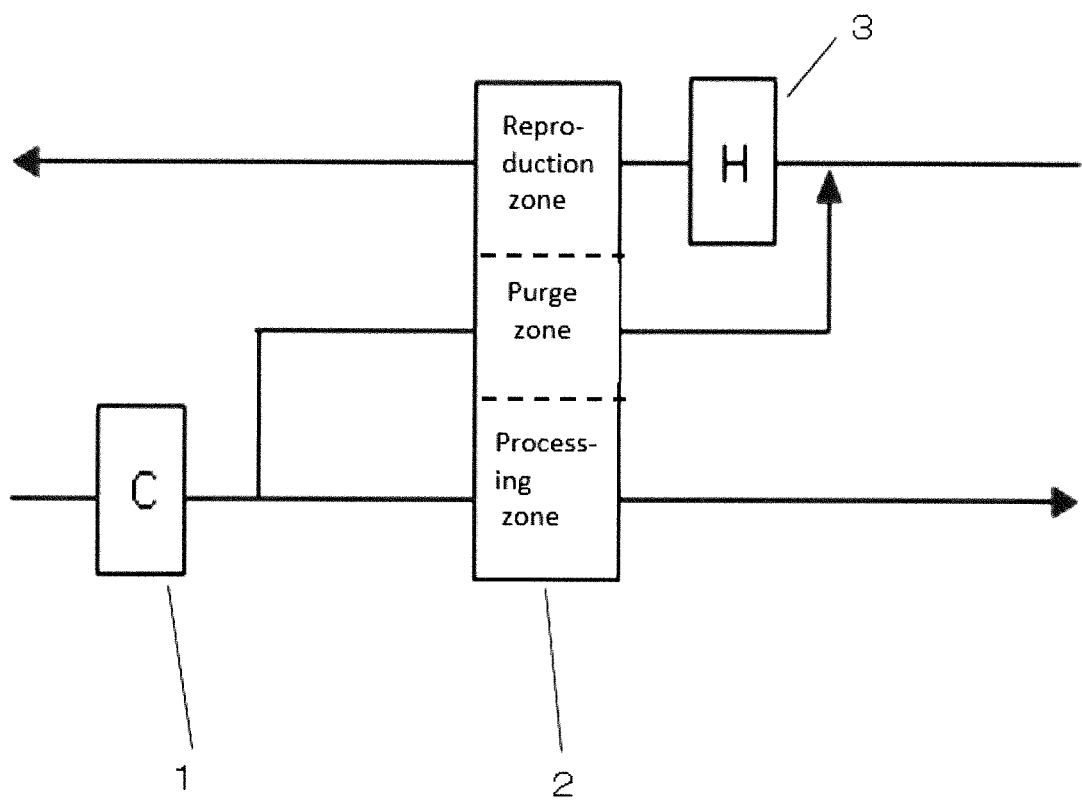
FIG. 1 is a flow figure showing Example 1 of the proposed dehumidifier.

Reference will now be made in detail to the embodiments, examples of which are illustrated in the accompanying drawings, wherein like reference numerals refer to the like elements throughout. The embodiments are described below to explain the present invention by referring to the figures.

The proposed device supplied indoors the air which passed through the adsorption zone of the adsorption rotor which can remove carbon dioxide and humidity simultaneously, and became low humidity with low carbon dioxide levels, and it realized the object of providing the dehumidification air conditioner which makes the carbon dioxide levels of supply air low, and it makes into the low dew point.

Hereinafter, it explains along FIG. 1 showing the flow of Example 1 of the proposal. Outdoor air OA is removed by the air filter (not shown) in dust. This outdoor air is cooled by pre air cooler 1, and dehumidification by dew condensation is performed. After the air which came out of pre air cooler 1 branches on two ways, the amount adjustment of winds of a part of the air is carried out by a damper etc. The processing zone (adsorption zone) of adsorption rotor 2 which can remove carbon dioxide and humidity simultaneously lets one side of branched air pass. A purge zone lets the remaining branched air pass.

Adsorption rotor 2 which can remove carbon dioxide and humidity simultaneously is manufactured using the following materials so that it may not have influence of humidity to the adsorption performance of carbon dioxide. Adsorption rotor 2 carries out corrugated (wave attachment) processing of the nonflammable sheet of glass fiber paper, ceramic textiles paper, living body solubility inorganic fiber paper, etc., and it is wound in the shape of a rotor and it processes it. Even if the sheet which constitutes a rotor has humidity using an inorganic system binder etc., the carbon dioxide capture material etc. which is formed of the potassium carbonate which can adsorb carbon dioxide, sodium carbonate, an ionic liquid, and an oxide of Ce or Zr are supported. Adsorption rotor 2 which can remove carbon dioxide and humidity simultaneously is divided into three, a processing zone, a purge zone, and a reproduction zone. Adsorption rotor 2 which can remove carbon dioxide and humidity simultaneously is rotated by the motor (not shown) etc. which were slowed down with the gear.

Here, an example of the manufacturing method for an adsorption rotor 2 with the capability for simultaneous carbon dioxide and humidity removable is described. A cerium oxide powder is used as the adsorption material (henceforth "Ce oxide adsorption material") for the rotor. The honeycomb adsorption object of Ce oxide is produced by, for example, impregnating a honeycomb adsorption object using a slurry containing Ce oxide, a binder, and water. Then, the honeycomb adsorption object is dried.

Primary particles of Ce oxide tend to flocculate and form secondary particles with particle diameters of more than 1 µm. The characteristics of Ce oxide such as catalyst activity and sinterability are subject to the size of secondary particles and their shape. The average secondary particle diameter of the Ce oxide powder was set to be 0.5 to 20 micrometers measured with a scanning electron microscope. Alternatively, the particle diameter can be measured by a laser diffraction/scattering type particle size distribution measuring device. To form a slurry having a viscosity in which a dipping process for the honeycomb adsorption object is possible, the average secondary particle size of the Ce oxide should be at least 0.5 micrometers. When the dipping process is carried out on the honeycomb adsorption object, it was found that the average secondary particle size of the Ce oxide should be no greater than 20 micrometers to avoid Ce oxide powder dropping off the honeycomb adsorption object (Ce oxide particles not being secured to the honeycomb adsorption object).

The size of the honeycomb cells affects the fluid resistance of the air which will pass through the honeycomb channels. In order to reduce the cost of the device, a general-purpose (off-the-shelf) fan can be used to pass air through the honeycomb channels. To accommodate the wind pressure generated by a general-purpose fan, the honeycomb size should have a low fluid resistance. Although other sizes are possible, a honeycomb size of 50 to 400 cells (number of honeycombs on the rotor surface) per square inch achieves these goals. In addition the length in the direction of a flute of the honeycomb (rotor cross direction) was set to 50 to 600 mm from a viewpoint of getting the performance which can simultaneously remove carbon dioxide and humidity with the amount of winds created by a general-purpose fan. A natural textile (fibrous) carrier formed from glass fiber paper or ceramic textile paper was used for the honeycomb base material. The honeycomb base material was fired at 300 degrees to 600 degrees, preferably 400 to 500 degrees (all temperatures herein are expressed as Celsius temperatures). As an adsorption material which can simultaneously remove carbon dioxide and humidity, the Ce oxide adsorption material is preferably supported on the rotor with a bulk specific gravity ratio (kg/m3) of 20%-70% or more specifically 40%-60% to the rotor. That is, the weight of the Ce oxide adsorbent is 20 wt. %-70 wt. % or 40 wt. %-60 wt. % the weight of the resulting rotor (weight of Ce oxide adsorbent+weight of the solid content of silica sol+weight of honeycomb substrate).

For the silica sol binder, a minimum particle diameter of 4 nm (manufacturer's catalog value) was chosen so that the silica sol functions as a humidity adsorption material and does not appreciably affect the carbon dioxide adsorption characteristics of the Ce oxide adsorption material. A maximum particle diameter of 50 nm (manufacturer's catalog value) was chosen for the silica sol binder to avoid silica powder falling off (to avoid silica powder dropping off the resulting adsorption rotor). The loading ratio of silica sol on the adsorption rotor was 5%-25%, preferably 10%-20% in terms of bulk specific gravity (kg/m3). That is, the weight of the solid content (dry basis weight) of the silica sol is 5%-25%, preferably 10%-20% wt. % the weight of the resulting rotor (weight of Ce oxide adsorbent+weight of the solid content of silica sol+weight of honeycomb substrate). For stability of the silica sol impregnating slurry, the pH was set to be acidic to weakly alkaline.

In order to raise the dehumidification performance of adsorption rotor 2 in which carbon dioxide and humidity are simultaneously removable, in addition to Ce oxide adsorption material, humidity adsorption material, such as zeolite and silica gel, may be mixed. That is, in addition to Ce oxide adsorption material which adsorbs carbon dioxide and humidity simultaneously, humidity adsorption material, such as zeolite and silica gel, is mixed, and it supports on adsorption rotor 2.

The low dew point air which passed through the processing zone and to which carbon dioxide levels became low is supplied to a source's low humidity workroom etc.

After being mixed with the outdoor air, the air which passed through the purge zone is heated to a temperature required for the reproduction of adsorption rotor 2 which can remove carbon dioxide and humidity simultaneously with reproduction heater 3, and is sent to a reproduction zone.

The air which came out of the reproduction zone is emitted to the exterior of a dehumidification air conditioner as exhaust air EA. In order to improve performance which removes carbon dioxide and humidity simultaneously, it branched and a part of processing air after pre air cooler passage was made into purging air, but it is good also as composition which introduces the outdoor air besides a direct device into a device, without branching processing air, and it makes into purging air. In order to reduce the consumption energy of reproduction heater 3, it is good also as composition which carries out sensible heat exchange of exhaust air EA which came out of the reproduction zone, and the outdoor air sent to a reproduction zone.

When the environment of low humidity is required, it is good also as composition which provides the dehumidification rotor which used zeolite and/or silica gel for the latter part (backside) of adsorption rotor 2 which can remove carbon dioxide and humidity simultaneously as adsorption material, that is divided into two zones, a processing zone and a reproduction zone, at least. By having such composition, it becomes possible to further dehumidify the air which passed adsorption rotor 2 which can remove carbon dioxide and humidity simultaneously.

Figure 2:
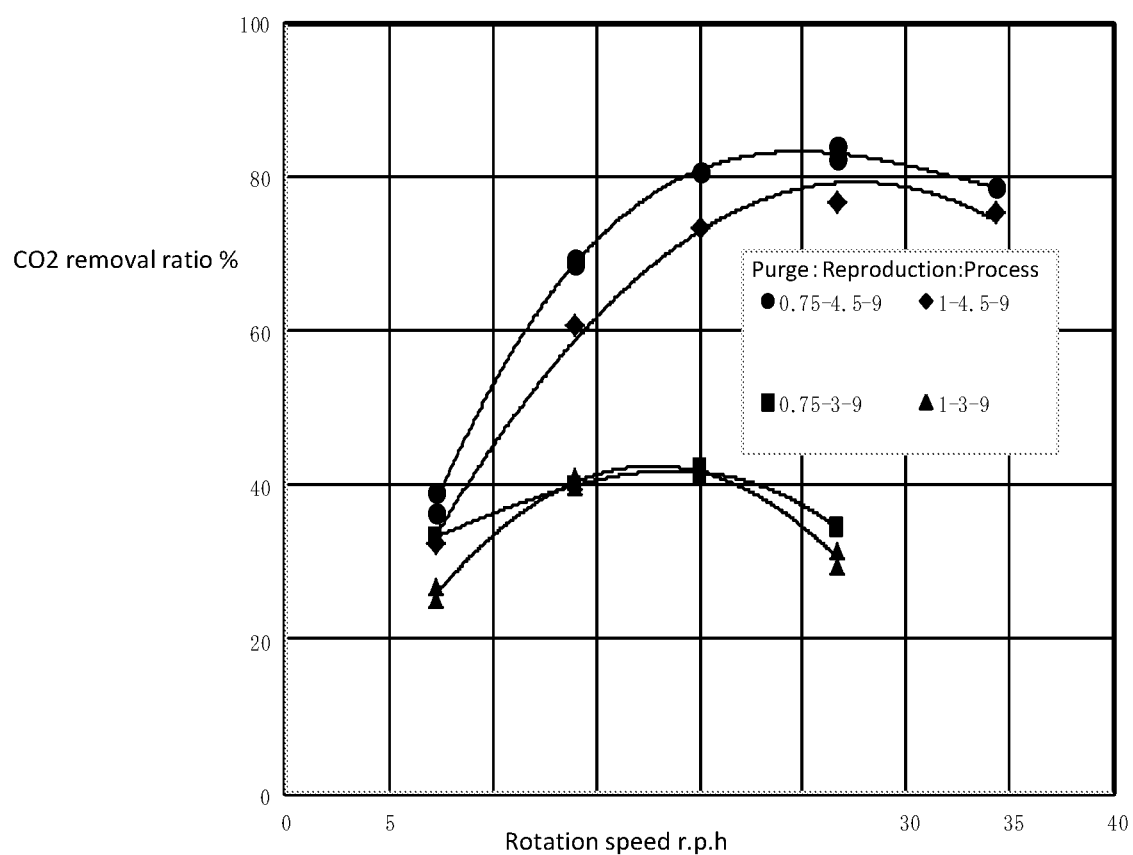
FIG. 2 shows the graph of a carbon dioxide extraction ratio to the rotor number of rotations at the time of changing the amount ratio of winds of each zone of a rotor.
Figure 3:
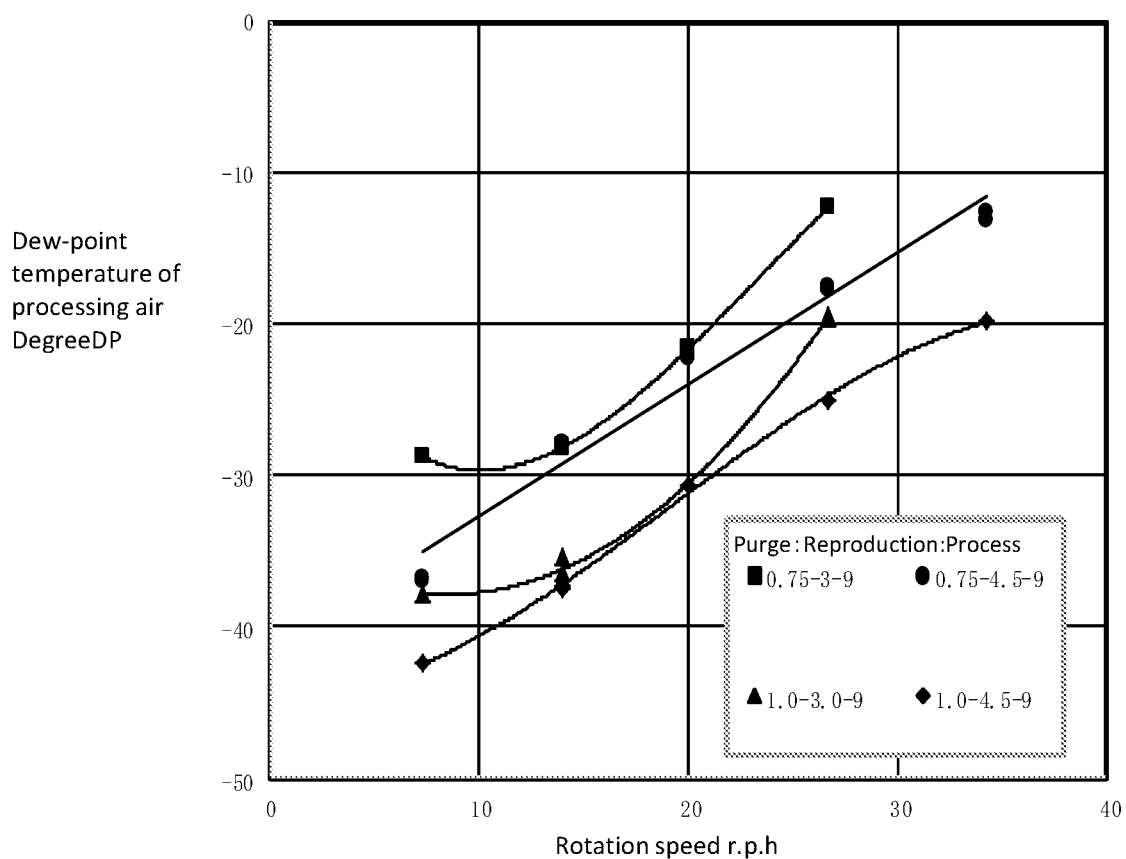
FIG. 3 shows the graph of processing exit dew point temperature to the rotor number of rotations at the time of changing the amount ratio of winds of each zone of a rotor.

The graph of a carbon dioxide extraction ratio to the rotor number of rotations (rotor number of rotations in 1 hour: rph) at the time of changing into FIG. 2 the amount ratio of winds which passes through a purge zone, a reproduction zone, and a processing zone using adsorption rotor 2 which can remove simultaneously carbon dioxide with a diameter of 320 mm and a width of 400 mm and humidity is shown. The treatment inlet carbon dioxide concentration 500 ppm, the treatment inlet air temperature 12<C., the treatment inlet air absolute humidity 6 g/kg (DA), the treatment inlet air velocity 2 m/s, the purge inlet air velocity 1.5 m/s to 2 m/s Test was conducted at a regeneration inlet carbon dioxide concentration of 500 ppm, a regeneration inlet air temperature of 140 degrees, a regeneration inlet air absolute humidity of 12 g/kg (DA), and a regeneration inlet air velocity of 2 m/s to 3 m/s. The graph of the relation of processing exit dew point temperature to the rotor number of rotations in the same conditions as FIG. 3 is shown.

From these graphs, although rotor number of rotations low as humidity performance is good, when balance with a carbon dioxide extraction ratio is seen, a purge zone, reproduction zone, processing zone is the amount ratio of winds of 1:4.5:9, and it understands rotor number of rotations that 20 rph is good.

In Example 1, since return air RA from sources, such as a low humidity workroom, is not used, the powerful organic-solvent gas of ignition quality is not emitted in a low humidity workroom, or gas harmful to a human body is not emitted. It is a dehumidification air conditioner which can be used also when gas which degrades adsorption rotor 2 which can remove carbon dioxide and humidity simultaneously is emitted in the source of supply of return air.

The proposed device can provide the dehumidification air conditioner which can make low the carbon dioxide levels in a low humidity workroom by using the adsorption rotor which can remove one set of carbon dioxide, and humidity simultaneously as above-mentioned.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

What is claimed is:

1. A honeycomb adsorption object which can carry out simultaneous removal of carbon dioxide and moisture, comprising:
    a fibrous carrier;
    a Ce oxide adsorption material supported by the carrier, the Ce oxide adsorption material being formed from a powder of Ce oxide having an average secondary particle diameter of 0.5 micrometer-20 micrometers; and
    a silica sol supported by the carrier, the silica sol having an average silica particle diameter of 4 nm-50 nm.

2. The honeycomb adsorption object according to claim 1, wherein
    the honeycomb adsorption object is in the form of a fluted honeycomb having flutes,
    the honeycomb has 50 cells to 400 cells per square inch, and
    the honeycomb has a length of 50 mm to 600 mm in a direction of the flutes of the honeycomb.

3. The honeycomb adsorption object according to claim 1, wherein
    the Ce oxide adsorption material accounts for 20 wt. %-70 wt. % of the honeycomb adsorption object based on the weight of the Ce oxide adsorption material/(weight of the Ce oxide adsorption material+dry basis weight of the silica sol+weight of the carrier), and
    on a dry weight basis, the silica sol accounts for 5 wt. %-25 wt. % of the honeycomb adsorption object based on the dry basis weight of the silica sol/(weight of the Ce oxide adsorption material+dry basis weight of the silica sol+weight of the carrier).

4. The honeycomb adsorption object according to claim 1, wherein the fibrous carrier is a textile obtained from at least one of a glass fiber and a bio-soluble inorganic fiber.

5. The honeycomb adsorption object according to claim 1, wherein
    the Ce oxide adsorption material functions as a first humidity adsorption material, and
    the honeycomb adsorption object further comprises a second humidity adsorption material.

6. The honeycomb adsorption object according to claim 2, wherein
    the Ce oxide adsorption material accounts for 20 wt. %-70 wt. % of the honeycomb adsorption object based on the weight of the Ce oxide adsorption material/(weight of the Ce oxide adsorption material+dry basis weight of the silica sol+weight of the carrier), and
    on a dry weight basis, the silica sol accounts for 5 wt. %-25 wt. % of the honeycomb adsorption object based on the dry basis weight of the silica sol/(weight of the Ce oxide adsorption material+dry basis weight of the silica sol+weight of the carrier).

7. The honeycomb adsorption object according to claim 6, wherein the fibrous carrier is a textile obtained from at least one of a glass fiber and a bio-soluble inorganic fiber.

8. The honeycomb adsorption object according to claim 7, wherein
the Ce oxide adsorption material functions as a first humidity adsorption material, and
the honeycomb adsorption object further comprises a second humidity adsorption material.

9. The honeycomb adsorption object according to claim 1, wherein the honeycomb adsorption object is in the form of a honeycomb rotor.

10. An adsorption device employing the honeycomb rotor according claim 9, which can simultaneously remove carbon dioxide and humidity, comprising:
a pre air cooler to cool and dehumidify outdoor air and produce pre-cooled air;
the honeycomb rotor according to claim 9, the honeycomb rotor being divided into at least a reproduction zone, a processing zone, and a purge zone, a first part of the pre-cooled air being sent to the purge zone of the honeycomb rotor to produce purged air, a second part of the pre-cooled air being sent to the processing zone of the honeycomb rotor, the processing zone simultaneously removing carbon dioxide and humidity and producing purified air, the purified air being supplied to a source as supply air; and
a reproduction heater to heat a mixture of outdoor air and the purged air, the reproduction heater producing heated air which is sent to the reproduction zone of the honeycomb rotor to remove humidity and carbon dioxide from the honeycomb rotor, the reproduction zone of the honeycomb rotor producing exhaust air which is exhausted out of the adsorption device.

11. The adsorption device according to claim 10, wherein
the outdoor air is preheated upstream from the reproduction heater to produce preheated air,
the outdoor air is preheated by performing sensible heat exchange between the outdoor air and the exhaust air from the reproduction zone of the honeycomb rotor, and
the preheated air is sent to the reproduction heater.

12. The adsorption device according to claim 10, wherein a dehumidification rotor is provided downstream from the processing zone of the honeycomb rotor to further dehumidify the purified air before the purified air is supplied to the source as supply air.

13. An adsorption device employing the honeycomb rotor according claim 9, which can remove simultaneously carbon dioxide and humidity, comprising:
a pre air cooler to cool and dehumidify outdoor air and produce pre-cooled air;
the honeycomb rotor according to claim 9, the honeycomb rotor being divided into at least a reproduction zone, a processing zone, and a purge zone, the pre-cooled air being sent to the processing zone of the honeycomb rotor, the processing zone simultaneously removing carbon dioxide and humidity and producing purified air, the purified air being supplied to a source as supply air, outdoor air being sent to the purge zone of the honeycomb rotor to produce purged air; and
a reproduction heater to heat a mixture of outdoor air and the purged air, the reproduction heater producing heated air which is sent to the reproduction zone of the honeycomb rotor to remove humidity and carbon dioxide from the honeycomb rotor, the reproduction zone of the honeycomb rotor producing exhaust air which is exhausted out of the adsorption device.

14. The adsorption device according to claim 13, wherein
the outdoor air is preheated upstream from the reproduction heater to produce preheated air,
the outdoor air is preheated by performing sensible heat exchange between the outdoor air and the exhaust air from the reproduction zone of the honeycomb rotor, and
the preheated air is sent to the reproduction heater.

15. The adsorption device according to claim 13, wherein a dehumidification rotor is provided downstream from the processing zone of the honeycomb rotor to further dehumidify the purified air before the purified air is supplied to the source as supply air.

* * * * *